United States Patent [19]

Scott et al.

[11] Patent Number: 4,868,822
[45] Date of Patent: Sep. 19, 1989

[54] MEMORY EMULATION METHOD AND SYSTEM FOR TESTING AND TROUBLESHOOTING MICROPROCESSOR-BASED ELECTRONIC SYSTEMS

[75] Inventors: Marshall H. Scott, Woodinville; Robert E. Cuckler, Bothell; John D. Polstra, Seattle; Anthony R. Vannelli; W. Douglas Hazelton, both of Everett, all of Wash.

[73] Assignee: John Fluke Mfg. Co., Inc., Everett, Wash.

[21] Appl. No.: 158,223

[22] Filed: Feb. 19, 1988

[51] Int. Cl.$^4$ .................... G06F 11/00; G01R 31/28
[52] U.S. Cl. .................................... 371/16; 364/200
[58] Field of Search ............. 371/16, 20; 364/200, 364/900

[56] References Cited

U.S. PATENT DOCUMENTS

| | | | |
|---|---|---|---|
| 4,455,654 | 6/1984 | Bhaskar et al. | 371/20 |
| 4,554,630 | 11/1985 | Sargent et al. | 364/200 |
| 4,674,089 | 6/1987 | Poret et al. | 371/25 |
| 4,691,316 | 9/1987 | Phillips | 371/20 |
| 4,740,895 | 4/1988 | Sargent et al. | 364/200 |
| 4,780,819 | 10/1988 | Kashiwagi | 364/200 |
| 4,785,416 | 11/1988 | Stringer | 364/200 |

Primary Examiner—Charles E. Atkinson
Attorney, Agent, or Firm—George T. Noe; Stephen A. Becker

[57] ABSTRACT

A method and system for testing and troubleshooting microprocessor-based electronic systems employs memory emulation techniques as well as other techniques to provide complete functionality tests and fault location. Fine-resolution sync pulses may be generated at preselected time positions during a bus cycle of interest to facilitate full troubleshooting fault isolation. Other features include bus testing using memory emulation techniques, using the chip select line of ROMs to encode test results, and techniques that keep a target microprocessor functioning in a system in which the kernel is dead.

30 Claims, 3 Drawing Sheets

MEMORY EMULATION METHOD AND SYSTEM FOR TESTING AND TROUBLESHOOTING MICROPROCESSOR-BASED ELECTRONIC SYSTEMS

BACKGROUND OF THE INVENTION

The present invention relates generally to testing and troubleshooting microprocessor-based electronic systems, and in particular to testing and troubleshooting such microprocessor-based systems using memory emulation techniques.

With increasingly complex microprocessor-based systems presently being implemented in a wide variety of consumer and industrial products, automation of test and troubleshooting procedures is virtually a necessity. A number of test techniques, such as signature analysis, logic level detection, frequency and event counting, pulsing and emulative testing, are well known and have been used for many years. In particular, emulative testers, so called because they emulate the behavior of kernel-related devices, are popular for functional testing and fault isolation in microprocessor-based boards or systems because in the first place they test the system from the inside out, and in the second place they can test a system in which the kernel is dead.

One such emulative tester is a microprocessor emulator described in U.S. Pat. No. 4,455,654 issued to K. S. Bhaskar et al. and assigned to John Fluke Mfg. Co., Inc. Here, a test system, which itself is a microprocessor-based system, is connected in place of a microprocessor in a unit under test (UUT). The Bhaskar et al. test system operates in a bus-access mode wherein single cycles of bus accesses are made and acted upon before making another. That is, for one bus cycle, the test system microprocessor is switched into signal communication with the UUT bus to perform a read or write operation. Then the test system microprocessor is switched over to the test system internal circuitry to generate another read or write command with a new address, or deal with information read from the UUT's memory. The bus switching required to effect single cycles of bus accesses is becoming a limitation of microprocessor emulators such as that described by Bhaskar et al. as microprocessor-based systems become more complex and operate at higher speeds. Suitable bus switches for newer microprocessor-based UUT's, e.g., for 80386 systems, are non-trivial and difficult to design. Accordingly, it would be desirable to provide a different method by which a test system can be connected into the kernel of a UUT to carry out diagnostic test procedures.

Another type of emulative testing that has been considered is ROM (Read-Only Memory) emulation because ROMs are in direct communication with the UUT system bus and also because the pin configurations of ROMs are relatively simple so that interface connectors are easily designed. Historically, ROM emulators have been used for software development or to verify that hardware is working. ROM emulators historically have not been used for troubleshooting or fault detection because no sync signal is available to synchronize test equipment with test results, and further because test equipment could not directly retrieve test information from the UUT ROM socket. A partial solution to this problem is described in U.S. Pat. No. 4,691,316, wherein a ROM emulator is connected to a ROM I/O port of a UUT and the results of diagnostic test results are read over the UUT address bus in the form of encoded address information, which are subsequently decoded and latched in the ROM emulator. It is to be pointed out, however, that this system does not provide complete fault diagnosis of a UUT kernel and is limited to what can be communicated over an address bus. Moreover, the trend in microprocessor systems is to increase the random-access portion of memory while reducing the read-only portion. It is conceivable that eventually ROM could be eliminated so that the use of ROM emulators would be obviated.

SUMMARY OF THE INVENTION

In accordance with the present invention, a method and system for testing and troubleshooting microprocessor-based electronic systems employs memory emulation techniques in addition to other troubleshooting techniques to provide complete functionality tests and fault location.

The test system comprises a microprocessor-based mainframe and an interface pod also including a microprocessor-based system which is connected to both the microprocessor and memory space of a unit under test (UUT). The interface pod includes special logic circuitry connected to the UUT microprocessor to provide a fine resolution sync pulse during a bus cycle of interest in order to provide full troubleshooting fault isolation that is as effective as that provided by prior art microprocessor emulation. The interface pod gains control of the UUT microprocessor, which then executes instructions provided by emulation RAM connected to the UUT memory space. An analyzer RAM monitors the UUT connections on a bus-cycle-by-bus-cycle basis, and indicates whether faults occur and on which bus cycle. The overall system permits several test features to be effected, including using the address lines of the UUT memory to retrieve diagnostic data, using the UUT chip select line to encode data which is retrieved and analyzed, using the analyzer RAM to facilitate a UUT bus test technique that allows full fault isolation of such faults, and a system of checks and balances to ensure that bus access took place correctly and that the UUT is kept alive while data is being analyzed. Also, the analyzer RAM facilitates a pipeline correction technique to ensure that UUT microprocessors with pipelining or prefetch features operate correctly.

It is therefore one object of the present invention to provide a method and system for testing and troubleshooting microprocessor-based electronic systems by use of memory emulation techniques.

It is another object of the present invention to proivde a test system for microprocessor-based systems that is not constrained by the limitation of bus switching circuitry.

It is a further object of the present invention to provide a sync pulse for full troubleshooting fault isolation that is as effective as that provided by microprocessor emulation.

It is yet another object of the present invention to provide a test system for microprocessor-based systems through memory emulation wherein such memory may be ROM or RAM or a combination of both.

Other objects, features, and attainments of the present invention will become obvious to those having ordinary skill in the art upon a reading of the following detailed description when taken in conjunction with the accompanying drawings.

BRIEF DESCRIPTION OF THE DRAWINGS

FIG. 4 is a flow chart of a command byte execution program including a standby loop.

DETAILED DESCRIPTION OF THE INVENTION

Figure 1:
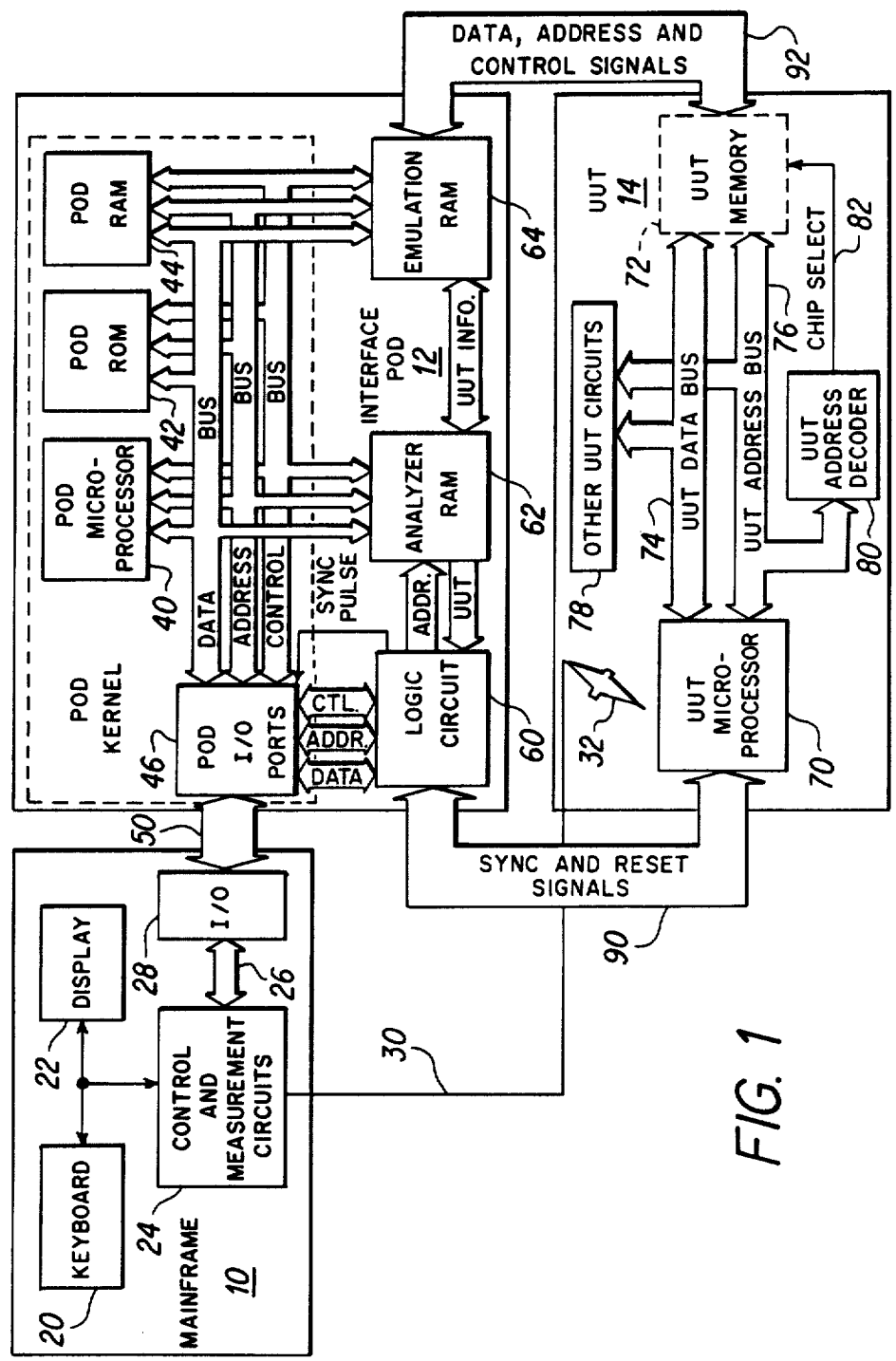
FIG. 1 is a generalized block diagram of a test system in accordance with the present invention.

Referring to FIG. 1, a generalized block diagram of a test system for functionally testing and diagnosing faults in microprocessor-based systems, or units under test (UUTs), in accordance with the present invention includes a mainframe 10 electrically connected to an interface pod 12, which in turn is electrically connected to a UUT 14 in a manner to be described in detail later.

Mainframe 10 includes, among other things, a keyboard 20 and a display device 22 electrically connected to a control and measurement circuits block 24. The control and measurements circuit block includes a microprocessor-based system, and is coupled via a bus 26 to an input/output circuit (I/O) 28 to communicate with the interface pod 12. Also connected to control and measurement circuits block 24 via a cable 30 is a probe 32, shown physically located for troubleshooting purposes within the UUT 14. Thus the mainframe controls the functional testing and troubleshooting of the UUT in response to actions of an operator, sending instructions and commands to the interface pod, and reporting the results to the operator. Examples of commercially-available equipment representative of a mainframe 10 are the 9000 Series Micro-System Troubelshooters and 9100 Digital Test Systems manufactured by John Fluke Mfg. Co., Inc.

Interface pod 12 contains a microprocessor-based system which is labeled pod kernel in the drawing. The pod kernel is made up of microprocessor 40, ROM 42, RAM 44, and I/O port 46, all of which are interconnected by data, address, and control buses. The interface pod 12 is connected to the mainframe 10 by a multiple-lead cable 50 coupled between I/O 28 and I/O port 46. The pod kernel is connected via its data, address, and control buses to a logic circuit 60, and analyzer RAM 62, and an emulation RAM 64. The purpose of these blocks will be discussed shortly.

UUT 14 is exemplary of any of a wide variety of microprocessor-based systems which may be tested using the system and techniques of the present invention, and only the central or core section will be discussed herein. The core section includes a UUT kernel made up of a microprocessor 70 and a memory 72 interconnected by data bus 74 and address bus 76. The UUT data and address buses 74 and 76, respectively, are connected to other UUT circuits 78 not germane to this discussion. The UUT address bus is connected to an address decoder 80 which produces chip select signals on a chip select line 82 connected to the UUT memory 72. A multiple-lead cable is connected between logic circuit 60 in the interface pod 12 to the UUT microprocessor 70 to provide communication therebetween. Another multiple-lead cable 92 is connected between emulation RAM 64 and UUT memory 72. Note that the UUT memory 72 is shown as a dashed line to represent that the UUT memory is either disabled or removed from its socket. The cable 92, therefore, may either plug directly into the UUT memory socket or may be clipped over the pins of a disabled UUT memory. The UUT microprocessor 70, however, remains in the circuit and is utilized to execute instructions from the emulation RAM 64. In this regard, UUT microprocessor 70 may be a completely different type than the pod microprocessor. For example, pod microprocessor 40 suitably may be a 68008 while the UUT microprocessor 70 suitably may be a 80386. Also, UUt memory 72 may be RAM or a ROM, or may be a combination of both. For example, in some of the newer microprocessor systems, a single memory is provided with a few bytes of ROM space at the higher end of the address space for boot-up purposes while the predominant portion of the memory space is RAM.

The following is a quick overview of the operation of the system shown in FIG. 1. An operator initiates a particular test of interest using the keyboard 20 and display 22, and control measurement circuits 24 generates instructions and commands which are passed through I/O 28, cable 50, and pod I/O 46 to the pod kernel. The pod microprocessor 40 sets up the circuitry within the interface pod 12 to perform the desired test. Diagnostic instructions are placed in the emulation RAM 64, and reset control is passed through the I/O port 46 and over cable 90 to gain control of microprocessor 70, which resets and then begins executing the instructions in emulation RAM 64. Analyzer RAM 62 monitors test results coming back over cable 92 and passes these results to the pod kernel which in turn transmits information back to the mainframe 10 via cable 50. Cable 90 picks timing signals off the microprocessor 70 and returns these to the logic circuit 60, which in turn generates a sync pulse which is returned to the mainframe 10 via cable 50. If faults are detected, the operator may be prompted to place probe 32 on a particular node within the UUT 14, and the sync pulse extracted from the UUT microprocessor 70 ensures that information read by the probe occurs at the appropriate time, i.e., within a bus cycle of interest.

One important aspect of the present invention is the use of the chip select line 82 to retrieve useful information from a Read operation performed on a UUT ROM at memory space 72. In this test method, UUT microprocessor 70 is reset, and begins executing instructions presented to memory space 72 by emulation RAM 64. As the UUT microprocessor 70 executes a number of bus cycles, UUT address decoder 80 decodes the chip selection as a series of ones and zeros. The analyzer RAM 62 monitors the chip select pin at the memory 72 socket, and indicates faults if a chip select signal during a particular bus cycle is not the logic level expected. In this manner, test results can be passed back to the interface pod from a ROM socket.

Figure 2:
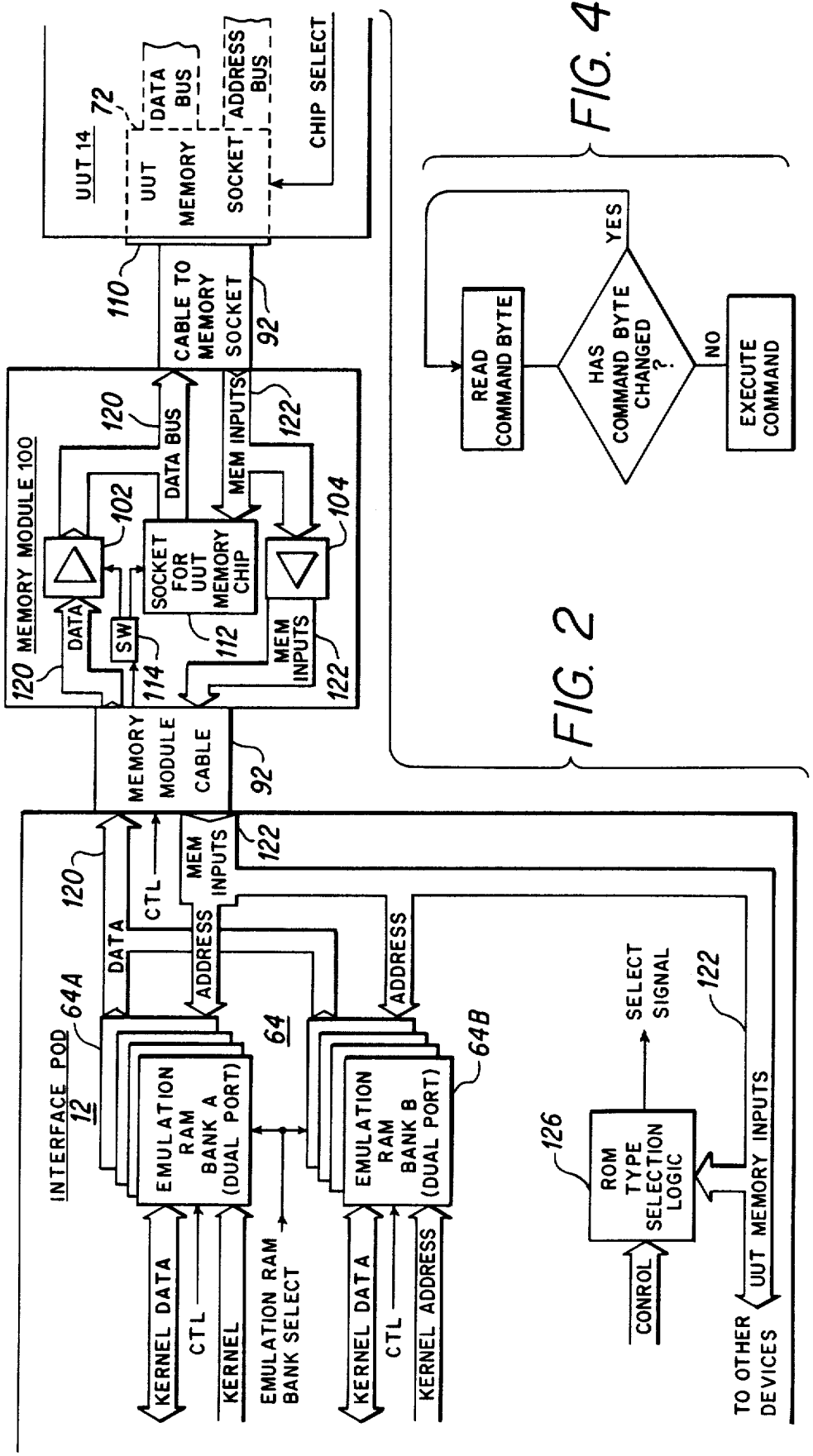
FIG. 2 is a more detailed block diagram of the emulation RAM connection of the interface pod of FIG. 1.

FIG. 2 shows in closer detail the interconnection between emulation RAM 64 and UUT memory 72. In particular, because the cable 92 may be quite long, a memory module 100 may be provided to condition the signals to ensure proper operation. Of course, if cable 92 is very short, then the memory module 100 is not needed. Included in the memory module 100 are buffers 102 and 104 interposed in the signal paths. The end of cable 92 may include a connector 110 for connecting directly into a UUT memory socket, and the ROM module 100 may include a socket 112 to plug the UUT memory into. In such a configuration, an operator can select between instructions from the interface pod 12, that is, from emulation RAM 64, or from the UUT memory in socket 112. Accordingly, a switch 114 may be provided to enable either the data buffer 102 or the memory socket 112 while disabling the other. In situations where the UUT memory being emulated is the boot ROM, depending upon the width of the UUT bus, there may be several UUT boot ROMs, requiring several connectors 110 and several memory modules 100. As a practical matter, the present invention provides sufficient flexibility to accommodate almost any UUT memory configuration.

One important feature of the present invention is to provide two banks of emulation RAM represented by emulation RAM banks 64A and 64B. To ensure that the UUT remains alive during functional testing, one bank of emulation RAM is always presented to the UUT microprocessor 70 during the test. In this operating feature of the present invention, the interface pod 12 pod kernel can be loading instructions into one of the banks while the other is switched over the UUT memory space and the UUT microprocessor 70 is executing instructions from that other bank. At the appropriate time, the banks can be switched in such a manner tha UUT microprocessor 70 is unaware that the instructions being executed are coming from another emulation RAM. The emulation bank select signals are produced by logic circuit 60, and will be discussed in connection with FIG. 3. Data from the emulation RAM banks 64A and 64B passes over a data bus 120 and through buffer 102 to the memory socket. Information from the UUT memory socket in the form of UUT memoryinputs is fed back over a bus 122 and through buffer 104 in the memory module 100 to the interface pod 112, and as will be seen later, these UUT memory inputs will be used by the analyzer RAM 62 and by the logic circuit 60. Also shown in FIG. 2 and connected to the UUT memory inputs bus 122 is a ROM type selection logic circuit 125, which, if UUT memory 72 is a ROM, generates a signal to ensure proper pin information being matched with the interface pod 12. That is, while the physical JEDEC pin configurations may be the same from ROM to ROM, the electrical connections may be different (in other locations) from ROM to ROM. The pod kernel tells the logic circuit 126 what type of ROM is to be emulated.

Figure 3:
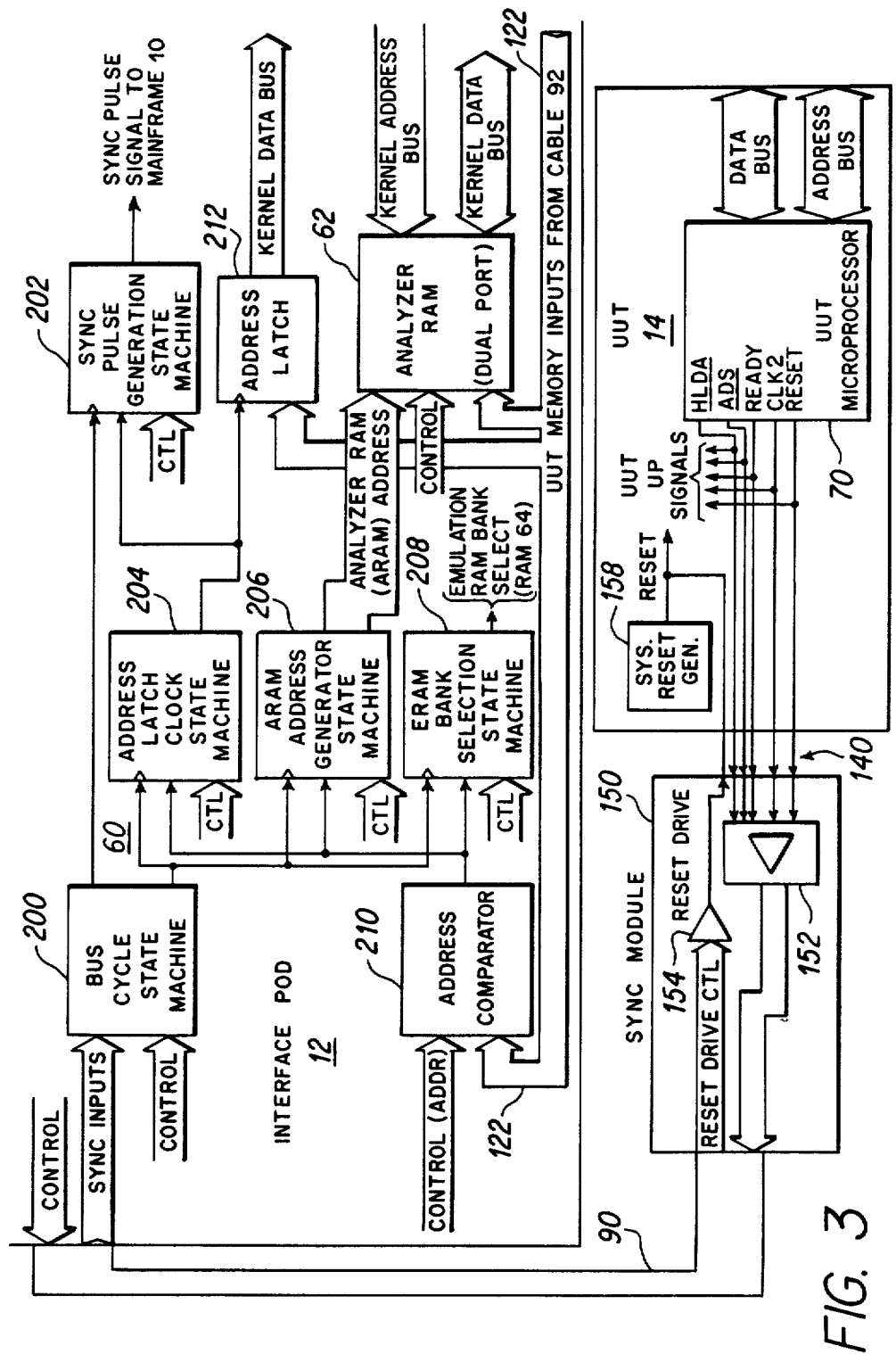
FIG. 3 is a more detailed block diagram of the logic circuit of the interface pod of FIG. 1 and its connection to the UUT microprocessor.

FIG. 3 shows in closer detail logic circuit 60, analyzer RAM 62, and interconnection of logic circuit 60 with the UUT microprocessor 70. One important aspect of the present invention is generating fine-resolution sync pulses at the appropriate time, as mentioned earlier. This is facilitated by picking sync input signals off the UUT microprocessor 70. For example, for the 80386 microprocessor, HOLD, HLDA (Hold Acknowledge), ADS, READY, CLK2, and RESET will provide suitable sync input signals. Connections may be made by "flying leads" 140 from a sync module 150, which is connected to cable 90. Sync module 150 contains a suitable sync input buffer 152 to condition the signals to ensure proper operation. The cable 90 also carries a reset drive control line, which is coupled to the input of a reset drive amplifier 154 in the sync module 150. The output of the reset drive amplifier 154 is a reset drive signal, which is applied as an override signal to the system reset output of a system reset generator 158 in the UUT 14 to gain control of the UUT mircroprocessor 70. Microprocessor signals which might interfere with ability to produce sync signals, such as the HOLD line in the 80386, may be overridden with appropriate control signals. Again, similar to the situation with the memory module 100 in FIG. 2, the sync module 150 is in the circuit because of the long length of cable 92, and may be omitted if the interconnection between logic circuit 60 and UUT microprocessor is sufficiently short.

Logic circuit 60 in interface pod 12 comprises a bus cycle state machine 200, a sync pulse generation state machine 202, an address latch clock state machine 204, an analyzer RAM address generation state machine 206, an emulation RAM bank selection state machine 208, an address comparator 210, and an address latch 212. All of these devices are connected to and receive inputs from the pod kernel control bus. That is, they receive their operational instructions from the pod kernel microprocessor 40 and its associated components.

Bus cycle state machine 200 receives as one of its inputs the sync input signals picked off UUT microprocessor 70, and the other input, as mentioned hereinabove, is a control signal from pod kernel microprocessor 40. Bus cycle state machine 200 monitors the execution of UUT microprocessor 70, and when the bus cycle of interest appears, as determined by the control input from the pod microprocessor 40, it issues control signals to the clock inputs of the other state machines 202–208 in the logic circuit 60.

Address comparator 210 receives as one of its inputs the UUT memory inputs from bus 122 of FIG. 2, and an address or region of addresses supplied by pod microprocessor 40. As the UUT microprocessor executes the instructions supplied by the emulator RAM 64, the address comparator monitors the UUT memory address lines as supplied by bus 122, and when the two inputs match, address comparator 210 "fires" and issues a signal to state machines 205, 206, and 208.

Since sync pulse generation for troubleshooting is an important aspect of the present invention, an example of how the sync pulses are generated will be helpful in understanding the basic operation of logic circuit 60. An important criterion is that the sync pulse be generated during a bus cycle of interest. The interface pod 12 is going to command the UUT 14 to perform a Read or a Write operation, and that Read or Write consists of one bus cycle. It is desired for troubleshooting purposes to produce a sync pulse at some selectable time during that Read or Write operation, i.e., address sync pulse, data sync pulse, or some other sync pulse. The operator keys the bus cycle of interest into the mainframe 10, which in turn commands the interface pod 12 microprocessor 40 to produce a sync pulse at the appropriate time. The control inputs to bus cycle state machine 200, address latch clock state machine 204, and address comparator 212 are loaded with the appropriate control signals. For example, if it is desired to have an address sync pulse, the timing of output of sync pulse generation state machine 202 is arranged so that an appropriate sync pulse is provided to the mainframe 10 at a time when address information is valid on the UUT microprocessor address bus. Likewise, for a data sync pulse, the appropriate sync pulse is provided to the mainframe when data is valid on the UUT microprocessor data bus.

Bus cycle state machine 200 produces a pulse train in response to the desired sync mode, in response to execution of microprocessor 70 and the control input from microprocessor 40. As microprocessor 70 executes, it continuously fetches instructions of emulator RAM 64, and the addresses of those instructions are monitored by comparator 212. When the last instruction fetch prior to the bus cycle of interest occurs, address comparator 212 "fires," issuing an output to address latch clock state machine 204, which is simply a synchronizing mechanism to synchronize the comparator output with the UUT microprocessor 70 sync signals. The synchronized output of state machine 204 is applied to sync pulse generation state machine 202, which starts counting down a preset number of bus cycles, as determined by the control input from the pod kernel, until it issues a sync pulse to the mainframe 10.

The output of address latch clock state machine 204 is also applied to address latch 212, which monitors the UUT memory inputs bus 122 and latches data received therefrom at the appropriate address. For extracting data over ROM address lines, for example, when the UUT is commanded to perform a Read Bus Cycle, the input to latch 212 may suitably be lower address bits of an address word, while the higher order bits are furnished to the address comparator 210.

The emulation RAM bank selection state machine 208 is simply a flip flop enabled by a control signal from pod microprocessor 40 to select either emulation RAM bank 64A or 64B at the appropriate time as established by address comparator 210 and bus cycle state machine 200.

The analyzer RAM address generation state machine 206 receives inputs from bus cycle state machine 200, address comparator 210, and control inputs from pod microprocessor 40 to produce addresses for analyzer RAM 62 at the appropriate times. Analyzer RAM 62 is utilized to test the integrity of the UUT bus structure.

Bus test is an important feature use in locating faults on the UUT kernel that cause the UUT microprocessor 70 to behave improperly, or the interface pod 12 to function improperly. For example, if there is short or an open on an address line at the UUT kernel, the UUT microprocessor 70 is not going to be able to fetch instructions properly from the emulator RAM (or from its own memory, for that matter). The bus test is perhaps the first step in testing in an unknown UUT, because it ensures that the UUT is at least up and running before going on to the other tests. If fundamental errors exist, then these are noted.

In the system of the present invention, mainframe 10 initializes the bus test, commanding the interface pod 12 to load the bus test program into emulation RAM 64. The pod microprocessor 40 then sets up the analyzer RAM 62 for clocking a sequence of bus cycles into RAM 62, as well as setting up the sync pulse generation state machine 202 to produce sync pulses at appropriate times to troubleshoot a faulty kernel if needed. The interface pod microprocessor 40 asserts reset of the UUT microprocessor 70, which then begins to execute instructions provided by emulation RAM 64. The sequence of UUT bus cycles is clocked into RAM 62, and when the sequence finishes, the microprocessor 40 evaluates the information stored in RAM 62 to determine if there are any bus faults, and if so, which lines are at fault, and in which step or bus cycle they occurred. The operator can then locate the particular fault using probe 32 in conjunction with sync pulses produced by sync pulse generation state machine 202.

As an additional troubleshooting tool, the operator may specify the data to be applied to the data bus during first bus cycle after UUT reset. By measuring a given data line during the first bus cycle after reset, the operator may directly confirm or deny that the data path is valid and operating properly between the memory socket 72 and the UUT microprocessor 70. This measurement technique is necessary to separate data bus direct problems from data bus symptoms indirectly caused other UUT faults.

The analyzer RAM 62 is a dual port device which permits the pod microprocessor 40 to read data out of RAM 62 as well as writing data into it. Thus a very flexible troubleshooting mechanism is provided. In fact, such a system permits troubleshooting of microprocessors having 'pipeline' or prefetch features. These newer microprocessors that have a pipelining feature fetch a number of instructions and store them in a pipeline in the processor, and then start executing, but not necessarily sequentially.

The test system of the present invention can determine when pipelining is occurring, and various other factors that occur on the UUT, such as different numbers of "wait" states in a bus cycle which change the sequence that instructions are fetched from the emulation RAM 64. That is, it is desired that the test system understand whether oddities occurring are the result of faults or whether they are simply a function of the pipelining characteristics of the particular microprocessor. And if pipelining is occurring, it is desirable that such pipelining not interfere with the test system's ability to diagnose faults on the UUT kernel.

Therefore, the analyzer RAM 62 stores addresses and test results. A program in the pod kernel analyzes this information in comparison with expected possibilities, and if a problem exists, the operator is notified via mainframe 10, and appropriate troubleshooting procedures using probe 32 are established. Thus pipelining is recognized and acknowledged by the test system of the present invention, and pass/fail information is passed to the mainframe 10.

By way of example in providing a complete understanding of the test system of the present invention, a hypothetical troubleshooting operation will be described. It will be assumed for this example that it is desired to command the UUT microprocessor to execute a "Read" cycle at an address selected by an operator of the test equipment, and to have the results returned to and displayed by the troubleshooting mainframe. The test system is appropriately configured with interface pod 12 connected to mainframe 10, and interface pod 12 connected to the UUT 14.

The operator presses a READ key on the mainframe 10, keys in the address desired, e.g., 0000, and presses an ENTER key. The mainframe 10 then commands the interface pod 12 to perform a Read at address 0000. Pod microprocessor 40 accepts the command and initiates a sequence of events. First, microprocessor 40 examines a status flag in pod RAM 44 to determine if it has control of the UUT, and quickly determines that it does not have control because the emulation RAM 64 does not contain a program. Accordingly, "Read/Write" code written in the machine language for the target UUT microprocessor 70 is loaded from the Pod kernel RAM 44 or ROM 42 into both banks of emulation RAM 64A and 64B.

Next, pod microprocessor asserts the reset line of UUT microprocessor 70 by applying a reset drive control signal via pod I/O port 46, cable 90, and buffer 154 in sync module 150 to override the output of UUT reset generator 158. At the same time, address comparator 210 is set up to monitor a predetermined "communication region" of address space in the emulation RAM 64.

Then the reset line of UUT microprocessor 70 is released. It should be mentioned that the communication region in one proposed commercial embodiment is a 128-byte space, and so seven address lines are used to access this space.

As soon as the reset line is released, UUT microprocessor 70 begins to fetch instructions ostensibly from its own boot ROM, but actually from the emulation RAM 64 apparently sitting in the UUT memory 72 socket. These first instructions are to initialize the UUT kernel for testing and then to access a predesignated reset-reference address within the communication region of emulsion RAM 64. As soon as this occurs, the address is recognized by address comparator 210, address comparator 210 trips and causes address latch 212 to latch what in this case is the seven lower-order bits of the address in order to determine what is being communicated. This information goes out on the pod kernel data bus to notify the pod microprocessor 40 whether or not the UUT microprocessor 70 has indeed been reset. Thus the interface pod software may use address bits to determine the status of the UUT microprocessor 70 as well as the data that is being returned from a Read operation.

After the UUT microprocessor 70 has been initialized, it first fetches an instruction from an address in the emulation RAM 64 into which a Command Byte has been loaded, and reads the Command Byte to determine the function it is to perform, e.g., Read, Write, or status. By letting Command Byte=0, a standby loop is effected whereby the UUT microprocessor 70 reads the Command Byte, and if it is zero, simply waits until the next fetch and reads the Command Byte again. This standby loop continues until Command Byte changes, at which time UUT microprocessor 70 executes a command based on the value of the least significant bits of the command byte. See FIG. 4.

In the present invention, control of the UUT microprocessor 70 is facilitated by the use of two banks of emulation RAM 64. For example, the instruction Command Byte=0 may be loaded into Bank A at the Command Byte address, and Command Byte=1 loaded into the same address in Bank B with all other addresses being loaded identically in the two banks. Then, at the appropriate time, as will be described below, the RAM banks are switched so that on the next fetch of the command byte, the microprocessor 70 reads Command Byte=1 and can then begin to execute the desired command.

Before the UUT microprocessor 70 actually begins to perform the predetermined command, however, it is desirable to ensure that the interface pod 12 has complete control of the UUT and that the UUT kernel is ready to respond to commands from the pod microprocessor 40. Therefore, as soon as the UUT microprocessor 70 has been reset, and pod microprocessor 40 has read this information from address latch 212, address comparator 210 is loaded to monitor the Command Byte address. As soon as the UUT microprocessor 70 reads the Command Byte address of emulation RAM 64, address comparator 210 trips, latching the lower order bits of the Command Byte address into address latch 212. Now the interface pod 12 knows the UUT microprocessor 70 has been initialized and is waiting to receive a command via the Command Byte. Next, address comparator 210 may be loaded to monitor the 128-byte communication region of emulation RAM 64 to make sure the UUT microprocessor 70 is not accessing any of those addresses. The program loaded into the emulation RAM 64 includes instruction which cause the UUT microprocessor 70 to access predesignated addresses within the 128-byte communication region of emulation RAM 64 if an interrupt or other error occurs. Thus, if the address comparator 210 trips during this test, an error has occurred. At this point, control of the UUT is signified by setting a flag in the pod kernel RAM 44.

The foregoing procedure may be implemented in a subroutine that can be called either at startup or at any time the interface pod 12 loses control of the UUT 14.

Once control of the UUT 14 by interface pod 12 has been established, a new Command byte is loaded into the emulation RAM 64. This information is loaded into the bank of RAM not presently being accessed by the UUT microprocessor 70 because until all of the interface pod 12 circuits are set up, it is desired to maintain the UUT microprocessor 70 in the standby loop.

Also, the bus cycle state machine 200, sync pulse generation state machine 202, address latch clock state machine 204, and address comparator 210 are set up to generate a sync pulse during the bus cycle of interest as described earlier so that a sync pulse signal will be sent to mainframe 10.

When everything is ready, the emulation RAM banks are switched by ERAM bank selection state machine 208 so that on the very next fetch of the Command Byte, UUT microprocessor 70 sees that the Command Byte has changed and can accordingly begin to execute the Read command by jumping to a routine previously loaded into the appropriate bank of emulation RAM 64. When the last address of the routing is read, address comparator 210 trips and activates the sync pulse generation circuitry. Meanwhile, the UUT microprocessor 70 stores the data which was read in registers internal to the UUT 14, and then jumps back into the standby loop while the sync pulse generation circuitry generates a sync pulse and completes its cycle.

While the UUT microprocessor 70 is executing in the standby loop, the idle emulation RAM bank is loaded with a "Send" Command Byte at the Command Byte address. Address comparator 210 is loaded to monitor the communication region of emulation RAM at addresses corresponding to expected Read data.

The emulation RAM banks are switched again, and the UUT microprocessor 70 sees the "Send" Command Byte and jumps to the Send routine. When the address being monitored by address comparator 210 is accessed by the UUT microprocessor 70, the comparator trips and causes address latch 212 to latch the lower order bits of the emulation RAM address. The pod microprocessor 40 reads the information stored in address latch 212, and thereafter, UUT microprocessor 70 is reverted to its standby loop. This procedure may be repeated as many times as necessary to retrieve all of the data. When all of the data is assembled from a particular Read Command, it is returned to mainframe 10.

While there has been shown and described the preferred embodiment accordingly to the present invention, it will be apparent to those skilled in the art that many changes and modifications may be made without departing from the invention in its broader aspects. It is therefore contemplated that the appended claims will not be construed in a limiting sense and will cover any such modifications and embodiments as fall within the true scope of the invention.

We claim:

1. A method of testing a device of the type having a microprocessor and a memory interconnected by data and address buses, comprising the steps of:
   substituting an emulation memory in place of said device memory;
   placing instructions in said memory emulation means and causing said microprocessor to execute said instructions;
   evaluating responses to said instructions from said microprocessor and detecting faults; and
   generating sync pulses at selected time positions during predetermined bus cycles as said microprocessor executes said instructions.

2. A method in accordance with claim 1 wherein said device further includes an address decoder coupled to said address bus and a chip select line connected from said address decoder and said memory, further comprising the step of decoding addresses accessed by said microprocessor to produce test results on said chip select line.

3. A method in accordance with claim 1 wherein said step of evaluating responses includes storing a sequence of bus cycles from said device, and evaluating each bus cycle to determine faults.

4. A method in accordance with claim 3 wherein said step of evaluating responses further includes comparing addresses accessed by said microprocessor with predetermined addresses, and comprising test results with a set of predetermined responses, so that if pipelining of fetches occurs, failure of both comparisons indicates a fault.

5. A method of testing a device of the type having a miroprocessor and a ROM interconnected by data and address buses, said device further including an address decoder coupled to said address bus and a chip-select line connected from said address decoder and said ROM, comprising the steps of:
   substituting an emulation memory in place of said ROM;
   placing instructions in said memory emulation means and causing said microprocessor to execute said instructions such that test results are provided by said address decoder on said chip select line; and
   retrieving said test results from said chip select line.

6. A method in accordance with claim 5 further comprising the step of generating sync pulses at selected time positions during predetermined bus cycles as said microprocessor executes said instructions.

7. Apparatus for testing a device of the type having a microprocessor and a memory interconnected by data and address buses, comprising:
   means for substituting an emulation memory in place of said device memory;
   control means for placing instructions in said emulation memory and causing said microprocessor to execute said instructions:
   evaluation means coupled to said control means and said emulation memory for comparing responses to said instructions from said microprocessor with a set of predetermined responses; and
   means coupled to said control means and said microprocessor for generating signals in synchronization with microprocessor bus cycles.

8. Apparatus in accordance with claim 7 wherein said signal generating means comprises a programmable bus cycle state machine responsive to timing control signals applied from said microprocessor.

9. Apparatus in accordance with claim 8 further comprising means for generating sync pulses in response to an output signal from said bus cycle state machine, wherein said sync pulses are generated at a preselected time during said bus cycle.

10. Apparatus in accordance with claim 9 further comprising a probe coupled to said control means and adapted to contact a node of said device for troubleshooting said device, wherein stimulus and response signals in said probe are synchronized with said sync pulses.

11. Apparatus in accordance with claim 7 wherein said evaluation means includes means for snychronizing test results with predetermined bus cycles.

12. Apparatus in accordance with claim 7 wherein said evaluation means further comprises a comparator responsive to a comparison of at least partial test results with predetermined values supplied by said control means thereby to generate a comparator output signal, and a state machine responsive to said bus cycle synchronization signals and said comparator output signal for generating test result synchronization signals.

13. Apparatus in accordance with claim 12 further comprising means for storing test results at a time determined by said test result synchronization signals.

14. Apparatus in accordance with claim 13 wherein said means for storing test results is a latch.

15. Apparatus in accordance with claim 13 wherein said means for storing test results is a RAM.

16. Apparatus in accordance with claim 7 wherein said control means comprises a processor-based system;

17. Apparatus in accordance with claim 7 wherein said emulation memory comprises a pair of RAMs, and means for switching said RAMs during testing in such a manner said microprocessor continues executing as though only only RAM were present throughout a given test.

18. Apparatus in accordance with claim 17 wherein said means for switching comprises a switchable logic circuit responsive to control signals from said control means and said bus cycle synchronization signals.

19. An apparatus including a control processor for testing a device of the type having a microprocessor and a memory interconnected by data and address buses, comprising;
   means connectable to said microprocessor for initiating execution of said microprocessor and developing therefrom bus cycle state signals;
   means connectable to said memory for providing diagnostic test instructions for execution by said microprocessor and receiving test results in response to said instructions;
   comparison means for generating a comparison signal in response to a comparison of said test results with predetermined information provided by said control processor;
   a logic control circuit for generating a plurality of control signals in response to predetermined combinations of bus cycle state signals, comparison signals; and
   means for storing said test results under control of one of said control signals.

20. An apparatus in accordance with claim 19 wherein said means connectable to said microprocessor includes a bus cycle state machine responsive to sync signals from said microprocessor for developing said bus cycle state signals.

21. An apparatus in accordance with claim 19 further comprising means for generating a sync pulse at a preselectable time during a predetermined bus cycle in response to selected said bus cycle state signals and said comparison signal.

22. An apparatus in accordance with claim 19 further comprising a troubleshooting probe coupled to said logic control circuit and adapted to contact a node of said device, said probe operating in synchronization with said sync pulse for testing said device.

23. An apparatus in accordance with claim 19 wherein said means connectable to said memory include emulation memory means substituted in place of said memory.

24. An apparatus in accordance with claim 23 wherein said emulation memory means comprises a pair of RAMs and means for switching said RAMs during testing such that said microprocessor continues executing as though only one RAM were present.

25. An apparatus in accordance with claim 19 wherein said means, for storing test results is a latch.

26. An apparatus in accordance with claim 19 wherein said means for storing test results is a RAM.

27. An apparatus for testing a device of the type having a microprocessor and a memory interconnected by at least an address bus, and further having an address decoder coupled between said address bus and a chip select line connected to said memory, comprising:

means for substituting an emulation memory in place of said device memory;

control means for placing instructions in said emulation memory and causing said microprocessor to execute said instructions;

means coupled to said chip select line for receiving chip select signals therefrom; and means for comparing said chip select signals with a predetermined set of signals to determine occurrence of a fault.

28. An apparatus for testing a device of the type having a microprocessor and a memory interconnected by data and address buses, comprising:

an emulation memory substituted in place of said device memory;

means for loading a set of bus test instructions into said emulation memory and causing said microprocessor to execute a sequence of bus cycles in response to said bus test instructions;

means for clocking said sequence of bus cycles into an analyzer memory; and means for comparing said sequence of bus cycles with a predetermined sequence to determine whether there are any bus faults.

29. An apparatus in accordance with claim 28 further comprises a troubleshooting probe coupled to said apparatus and adapted to contact a node of said device, said probe operable in synchronism with said cycles to test said device.

30. An apparatus in accordance with claim 28 wherein said emulation memory comprises a pair of RAMs and means for switching said pair of RAMs such that bus test instructions can be loaded into one RAM while said microprocessor is executing bus test instructions in the other RAM.

* * * * *